United States Patent [19]

Hatanaka

[11] 4,193,906

[45] Mar. 18, 1980

[54] COMPOSITIONS FOR SOLID WRITING MATERIALS AND WRITING IMPLEMENTS

[75] Inventor: Akio Hatanaka, Hirakata, Japan

[73] Assignee: Sakura Color Products Corporation, Japan

[21] Appl. No.: 877,580

[22] Filed: Feb. 14, 1978

[51] Int. Cl.$^2$ ................................................ C08K 5/10
[52] U.S. Cl. .................. 260/31.2 R; 106/19; 106/22; 106/23; 106/26; 260/31.4 R; 260/32.8 R; 260/33.2 R; 260/33.4 R; 260/33.6 UA; 260/33.8 UA; 260/42.21; 525/154
[58] Field of Search ............. 260/31.2 R, 31.4 R, 260/32.8 R, 33.4 R, 33.6 R, 33.8 UA, 42.21; 106/19, 22, 23, 26

[56] References Cited

U.S. PATENT DOCUMENTS

| | | | |
|---|---|---|---|
| 2,944,034 | 7/1960 | Baird | 260/DIG. 38 |
| 3,011,899 | 12/1961 | Bergman | 106/19 |
| 3,903,034 | 9/1975 | Zabiak et al. | 260/DIG. 38 |

Primary Examiner—J. Ziegler
Attorney, Agent, or Firm—McGlew and Tuttle

[57] ABSTRACT

A composition for a solid writing material and a writing implement, the composition comprising: (i) at least one of dibenzylidene sorbitol and derivatives thereof and tribenzylidene sorbitol and derivatives thereof, (ii) at least one of (a) esters of a mono-saturated fatty acid having 10 to 20 carbon atoms and a mono-saturated aliphatic alcohol having 1 to 8 carbon atoms and (b) a mixture of the ester or esters and at least one liquid paraffin, (iii) a resin component, (iv) a coloring agent, and (v) an organic solvent.

15 Claims, No Drawings

COMPOSITIONS FOR SOLID WRITING MATERIALS AND WRITING IMPLEMENTS

This invention relates to compositions for solid writing materials of the novel type for writing and drawing on plastics panels, metal panels, ceramics panels, resin-impregnated paperboard panels, plastic-coated wood panels and other writing panels, such that the writings and drawings produced on the panel are readily erasable with a dry eraser, for example with a blackboard eraser or dry fabric, paper or the like. The invention is also concerned with writing implements comprising such a solid writing material.

So-called "marking ink" in the form of a liquid is generally used as a writing material for producing erasable writings, drawings and markings on writing panels. The marking ink heretofore known, however, is prone to degradation due to the evaporation of the solvent and to the resulting change in its composition. The evaporation of the solvent makes the ink progressively viscous and causes the solid components to deposit, eventually clogging up the interiror of the writing implement which utilizes a capillary action and rendering the implement unusable in a relatively short period of time. Moreover the writings or drawings produced are not completely erasable and tend to leave traces of stain on the surface. In view of these drawbacks, it has been strongly desired to provide a solid writing material for use on writing panels. Crayons have long been used as solid drawing materials. Although highly adherent to the surface of paper, crayons have poor adhesion to panels of plastics, metal or ceramics. When made rough-surfaced, these panels could be useful for crayons, but the drawings produced thereon would not be easily erasable. Despite the attempts heretofore made to improve crayons and provide solid writing materials for use on writing panels, satisfactory results still remain to be achieved.

Accordingly an object of this invention is to provide a solid writing material of the novel type useful for writing, drawing and marking and having outstanding writability on plastics, metal, resin-impregnated paperboard, plastics-coated wood, ceramics or like panels for writing and drawing.

Another object of this invention is to provide a solid writing material of the novel type having high erasability when used on writing panels of plastics, metal, resin-impregnated paperboard, plastics-coated wood, ceramics, etc.

Another object of this invention is to provide a novel solid writing material which retains its quality with high stability in spite of the lapse of time so as to be usable for a prolonged period of time.

Other objects and features of this invention will become apparent from the following description.

Throughout the specification and appended claims, the term "solid" refers to the state of a material in which the material is shapable as specified by any desired method, is handleable as a solid under steady or semi-steady conditions at room temperature but is flowable and can adhere to a writing surface when subjected to a suitable pressure given for writing or drawing.

This invention provides compositions for writing materials, the compositions comprising (i) at least one of dibenzylidene sorbitol and derivatives thereof and tribenzylidene sorbitol and derivatives thereof, (ii) at least one of (a) esters of a mono-saturated fatty acid having 10 to 20 carbon atoms and a mono-saturated aliphatic alcohol having 1 to 8 carbon atoms and (b) a mixture of the ester or esters and liquid paraffin (s), (iii) a resin component, (iv) a coloring agent, and (v) an organic solvent. The invention also provides solid writing materials prepared from the compositions as well as writing implements in which the solid material is used.

To overcome the foregoing problems encountered in the prior art, I have conducted extensive research and consequently prepared a composition comprising a resin component, coloring component and organic solvent in combination with the component (i) mentioned above, namely at least one of dibenzylidene and tribenzylidene sorbitols and derivatives thereof and with the component (ii), namely at least one of the saturated fatty acid esters and the mixture specified above. I have found that the composition is useful for preparing a solid writing material which retains its composition and quality with high stability over a prolonged period of time, has high writability on plastics, metal, ceramics or like panels for writing and drawing purposes and possesses satisfactory erasability when applied to such panels. This invention has been accomplished based on these novel findings.

Although research has yet to be made to fully clarify why these remarkable results are achievable, the outstanding results appear to be attributable to the conjoint use of (i) at least one of dibenzylidene sorbitol, tribenzylidene sorbitol and derivatives of the sorbitols and (ii) at least one of esters of a mono-saturated fatty acid having 10 to 20 carbon atoms and a mono-saturated aliphatic alcohol having 1 to 8 carbon atoms and a mixture of the esters and liquid paraffin(s). Whereas the component (i) is known as a thixotropy imparting material, the usefulness of the component (i) in this invention is not limited to its property to impart thixotropy to the composition, because other substances such as hydrogenated castor oil which are similarly known as thixotropy imparting materials, when substituted for the component (i), will give a composition which is exceedingly poor in stability and erasability and is practically unusable. The component (ii) appears a function mainly as a releasing agent for erasing the composition as applied to the writing surface. However full explanation has yet to be made why the above-specified ester or mixture of the ester and liquid paraffin alone imparts high erasability to the composition, i.e. to the writing material, without impairing and stability, thixotropic property and writability of the material.

The dibenzylidene sorbitol and derivatives thereof or tribenzylidene sorbitol and derivatives thereof are condensation products of sorbitol and an aromatic aldehyde of the formula

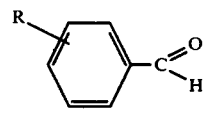

wherein R is hydrogen or alkyl having 1 to 3 carbon atoms. Although condensation products of an aromatic aldehyde and a polyhydric alcohol with not less than 5 hydroxyl groups such as xylitol, mannitol and the like act to solidify organic solvents, the condensation products of the aromatic aldehyde and sorbitol alone are capable of giving a thixotropic property to the writing materials of this invention without deteriorating the stability of their composition and quality over a prolonged time and outstanding writability and erasability thereof. Examples of useful dibenzylidene sorbitol derivatives are compounds in which the benzene nucleus of each benzylidene group of dibenzylidene sorbitol has a $C_{1-3}$ alkyl group at an optional position, such as [di-(p-methylbenzylidene)]-sorbitol, [di-(m-ethylbenzylidene)]-sorbitol, etc. Similarly examples of useful tribenzylidene sorbitol derivatives are compounds in which the benzene nucleus of each benzylidene group of tribenzylidene sorbitol has a $C_{1-3}$ alkyl group at an optional position, such as [tri-(p-methylbenzylidene)]-sorbitol, [tri-(m-ethylbenzylidene)]-sorbitol, etc. According to this invention, dibenzylidene and tribenzylidene sorbitols and derivatives thereof may be used singly or in admixture. These compounds are used in an amount of 2 to 12 parts by weight, preferably 3 to 8 parts by weight, per 100 parts by weight of the composition. If less than 2 parts by weight of the component (i) is used, difficulties are encountered in effecting gelation, leading to reduced erasability, whereas with more than 12 parts by weight of the component (i) present, the writing material prepared will be too hard and have low writability.

Examples of useful esters of a mono-saturated fatty acid having 10 to 20 carbon atoms and a monosaturated aliphatic alcohol having 1 to 8 carbon atoms are methyl caprate, ethyl caprate, butyl laurate, ethyl myristate, isopropyl myristate, butyl myristate, ethyl palmitate, propyl palmitate, amyl palmitate, methyl stearate, propyl stearate, butyl stearate, octyl stearate, etc. Examples of useful liquid paraffins are liquid paraffins (boiling point: at least 300° C.; specific gravity $d_{20}^{20}$: 0.860–0.890; viscosity: at least 37 centistokes (37.8° C.)) and light liquid paraffins (boiling point: at least 300° C.; specific gravity $d_{20}^{20}$: 0.830–0.870; viscosity: less than 37 centistockes (37.8° C.)) as prescribed in Japanese Pharmacopoeia, 9th Revision. According to the present invention, the above-mentioned fatty acid esters are usable singly or in admixture. Also usable is a mixture of at least one of the fatty acid esters and at least one of the liquid paraffins exemplified above. The component (ii) thus composed of this invention, which is serviceable mainly as a releasing agent for imparting erasability to the present compositions, is used usually in an amount of 10 to 50 parts by weight, preferably 20 to 30 parts by weight, per 100 parts by weight of the composition. If less than 10 parts by weight of the component (ii) is used, an insufficient releasing effect and therefore low erasability will result, whereas with more than 50 parts by weight of the component (ii) present, the component will act to separate the resin component from the resulting composition, giving reduced stability to the composition and rendering the composition sticky. When the fatty acid ester and liquid paraffin are used in admixture, usually up to 100 parts by weight, preferably 20 to 60 parts by weight, of the latter is used per 100parts by weight of the former. The liquid paraffin, when used conjointly with the ester, affords improved erasability without impairing the other properties of the composition to an extent.

The resin component (iii) of this invention must be soluble in organic solvents used in this invention and capable of forming coatings on the writing surface with good adhesion and also with high erasability. Examples of useful resins are vinyl resins, cellulose resins, acrylic resins, etc. Examples of suitable vinyl resins are vinyl chloride resin, vinyl acetate resin, vinyl acetate-vinyl chloride copolymer resin, vinylidene chloride resin, polyvinyl butyral, polystyrene styrenemaleinic acid copolymer, etc. These resins are used singly or in admixture. Examples of useful vinyl chloride resins are those having a molecular weight of about 19,000 to about 75,000 which are generally used for coating compositions and adhesive compositions. It is preferable to use those having a molecular weight of 30,000 to 60,000. Examples of useful vinyl acetate resins are those having a molecular weight of about 25,000 to about 250,000, more preferable resins being those having a molecular weight of 35,000 to 120,000. Examples of useful vinyl acetate-vinyl chloride copolymer resins are those containing up to about 15% of vinyl acetate in mole ratio and having a molecular weight of about 20,000 to about 60,000 preferably 30,000 to 50,000. Examples of useful vinylidene chloride resins are those having a relatively low molecular weight of about 80,000 to about 120,000. Examples of useful polyvinyl butyrals are those having a butyralization degree of 35 to 90% and having a molecular weight of about 20,000 to about 70,000, preferably 35,000 to 60,000. Exemplary of useful cellulose resins are ethyl cellulose, acetyl cellulose, nitro cellulose, acetylbutyryl cellulose, etc. These cellulose resins are used alone or in admixture. Examples of suitable ethyl cellulose resins are those containing at least 40%, preferably 40 to 50%, of ethoxygroups and having a molecular weight of about 70,000 to about 120,000. Examples of suitable acetyl cellulose resins are those containing 20 to 40%, preferably 25 to 35%, of acetyl groups and having a molecular weight of 60,000 to 100,000. Examples of suitable nitro cellulose resins are those having a nitrogen content of 10 to 12% and a molecular weight of about 60,000 to about 110,000. Exemplary of suitable acetylbutyryl cellulose resins are those containing 6 to 30% of acetyl groups and 17 to 50% of butoxy groups and having a molecular weight of about 60,000 to about 100,000. Examples of useful acrylic resins are polyacrylic esters. Among these resins, preferable are vinyl resins and cellulose resins. The resin component (iii) is used usually in an amount of 10 to 40 parts by weight, preferably 15 to 25 parts by weight, per 100 parts by weight of the composition.

Examples of useful coloring agents (iv) are known pigments used for coating compositions, crayons, marking inks and the like and oil-soluble dyes. At least one of these coloring agents is used. Oil-soluble dyes are dispersible in the present compositions more uniformly than pigments, serving to give a uniform and attractive color to the writing surface, while pigments have fastness to light and enable the composition to retain the color free of changes over a prolonged period of time. Accordingly the two types of coloring agents, when conjointly used as desired, will give writing compositions having superior color effects. Any of generally used pigments is usable, examples being titanium oxide, red iron oxide, ultramarine, carbon black, Carmine 6B, Phthalocyanine Blue 4920S, Lake Red C and pigments processed with nitro cellulose. Useful oil-soluble dyes are those generally known, such as phthalocyanine dyes, pyrazolone dyes, Nigrosine dyes, anthraquinone dyes, azo dyes, chromium complex dyes, etc. Examples of phthalocyanine dyes are Oil Blue BOS (trade mark, product of Orient Chemical Industries Ltd., Japan), Solvent Blue 55 (e.g. Neozapon Blue FLE, trade mark, product of BASF Dyes and Chemicals Ltd., West Germany), etc. Examples of pyrazolone dyes are Solvent Yellow 19 (e.g. Vari Fast Yellow 3104, trade mark, product of Orient Chemical Industries Ltd., Japan), Solvent Yellow 21 (e.g. Neozapon Yellow R, trade mark, product of BASF Dyes and Chemicals Ltd., West Germany), etc. Examples of Nigrosine dyes are Solvent Black 5 (e.g. Nigrosine Base, trade mark, product of Chuo Gosei Kagaku Co., Ltd., Japan), etc. Examples of anthraquinone dyes are Solvent Violet 14 (e.g. Oil Violet 732, trade mark, product of Orient Chemical Industries Ltd., Japan), etc. Examples of azo dyes are Fast Orange RR (trade mark, product of Dainichi Seika Color & Chemicals Manufacturing Co., Ltd., Japan), etc. Examples of chromium complex dyes are Neozapon Black RE (trade mark, product of BASF Dyes and Chemicals Ltd., West Germany), etc. These coloring agents can be used in an amount of 2 to 30 parts by weight per 100 parts by weight of the composition. If less than 2 parts by weight of such a coloring agent is used, the desired color effect will not be achieved, whereas use of more than 30 parts by weight of the agent is unlikely to produce any noticeably improved effect. When a pigment is used as the coloring agent, it is more preferable to use 4 to 25 parts by weight of the pigment per 100 parts by weight of the composition. When oil-soluble dyes are used which are generally superior in color developing property, satisfactory results are achievable even with use of 2 to 10 parts by weight of the dye per 100 parts by weight of the composition, the preferred amount thereof being 3 to 7 parts by weight per 100 parts by weight of the composition.

The organic solvents (v) to be used in this invention must be highly compatible with the resin component (iii). In view of the stability of the composition against degradation and drying velocity of the composition as applied, useful solvents are those having a boiling point of about 70° to about 220° C., preferably about 100° to about 200° C. Examples of such solvents are glycols, ethers of glycols, ether esters of glycols, aromatic hydrocarbons, cyclohexane hydrocarbons, ketones, lower fatty acid esters, tetrachloroethylene, isobutyl alcohol etc. Examples of useful glycols are ethylene glycol, diethylene glycol, propylene glycol, hexylene glycol, etc. Examples of useful ethers of glycols are methyl ether, ethyl ether, propyl ether, butyl ether and like ether of the above-mentioned glycols. Examples of ether esters of glycols include acetates of the above-mentioned ethers of glycols. Examples of useful aromatic hydrocarbons include xylene and tetralin. Examples of suitable cyclohexane hydrocarbons include ethylcyclohexane, methylethylcyclohexane, n-propylcyclohexane, n-butylcyclohexane, etc. Examples of useful ketones include methyl ethyl ketone, methyl isobutyl ketone, diethyl ketone, methyl propyl ketone and diisopropyl ketone. Examples of useful low fatty acid esters include butyl acetate and ethyl propionate. These solvents are used singly or in admixture in an amount of 30 to 70 parts by weight, preferably 45 to 60 parts by weight, per 100 parts by weight of the composition.

For illustrative purposes, a process for preparing the compositions of this invention will be described below. The order stated in which the components are added is not limitative but can be changed as desired. First, the resin component (iii) is dissolved in the organic solvent (v) with stirring and, if desired, with moderate heating. When a dye is used as the coloring agent (iv), it is preferable to add the dye to the resin solution and stir the mixture until a uniform solution or dispersion is obtained. When a pigment is used as the coloring agent (iv), it is preferable to add the pigment to the resin solution and thoroughly knead the mixture in a pot mill or a three-roll mixer. In this procedure, a uniform mixture can be prepared advantageously by adding the pigment to suitable portion of the resin solution, kneading the mixture, adding the remainder of the resin solution to the kneaded mixture and further kneading the resulting mixture. Finally, the component (i), namely at least one of di- and tribenzylidene sorbitols and derivatives thereof, is added to the colored dispersion, and the resulting mixture is heated with stirring to a temperature close to the boiling point of the solvent used to completely dissolve the component (i) and obtain a composition. It should be noted that the component (ii), serving as a releasing agent in this invention, can be added substantially in any step of the process described above. Thus the component (ii) may be added to the organic solvent (v) conjointly with the resin component (iii) or to the resin solution simultaneously with the addition of the coloring agent (iv) thereto. Alternatively the component (ii) may be added to the colored solution simultaneously with or after the addition of the component (i) thereto.

The writing implements of this invention are made by the following method. The composition in a liquid state at an elevated temperature is placed into a mold with a cavity of specified shape, e.g. circular or square in cross section, and solidified by cooling. Alternatively the composition is extruded into a cylinder, square pillar or the like at room temperature or with heating. The extrudate, if hot, is cooled for solidification. The shaped composition thus prepared is placed into a suitable air-impermeable case for preservation. The solid composition will be exposed at its front end when put to use. Examples of useful cases are those of a capped case of the extensible type similar to those used for putting up rouges, glue sticks or the like and those comprising a tube of air-impermeable material, such as aluminum foil, resin film, aluminum foil-resin film composite sheet or paper impregnated with resin, and a cap or lid attached to each end of the tube.

The writing implement is used on enameled metal panels, ceramics panels, wood panels coated with plastics, paperboard panels impregnated with resin and like writing panels or boards with application of slight pressure in the same manner as chalks. By virtue of the pressing contact of the writing implement with the writing surface, the writing material becomes flowable and adheres to the surface, producing writings or drawings thereon. Since a major portion of the solvent on the surface evaporates off within a short period of time after writing, the resulting coating is readily erasable with a usual blackboard eraser, or dry fabric, paper or the like, leaving no stain on the writing panel. The solid writing materials according to this invention are preservable for a greatly prolonged period of time substantially free of any changes in composition insofar as they are put up in cases. Should the front end surface of the writing implement dry to some extent with the cap of the case left open, the dry portion will be removable to expose a wet surface for smooth writing by applying to the front end a slightly greater writing pressure than the usual.

The features of this invention will become more apparent from the examples given below, in which the parts are all by weight.

EXAMPLE 1

To 61 parts of isobutyl alcohol are added 15 parts of polyvinyl butyral (trade mark: "Denka Butyral #2000L," product of Electro Chemical Industries Co., Ltd., Japan), 4 parts of dibenzylidene sorbitol (trade mark: "Gelol D," product of New Japan Chemical Co., Ltd., Japan) and 15 parts of butyl stearate, and the mixture is stirred at room temperature to prepare a solution. Carbon black (5 parts) is added to a portion of the solution, the mixture is thoroughly kneaded in a three-roll mixer, the remainder of the solution is added to the kneaded mixture, and the resulting mixture is further kneaded with heating at 110° C. The composition obtained is extruded through a tubular die, 12 mm in inside diameter, and the extrudate is cooled and then cut into 60-mm-long portions to prepare a solid writing material.

The writing material has good writability on enameled metal panels, plastics panels, ceramics panels, plastics-coated wood panels and like writing panels with application of small pressure. The writings are completely erasable with dry fabric without leaving any trace of stain.

A piece of the solid writing material is placed in a capped case of the extensible type having an interior space, 12 mm in inside diameter and 60 mm in length, then allowed to stand for 6 months with the cap closed and thereafter put to use. The test piece is usable free of any degradation.

Another piece of the solid writing material, similarly encased, is allowed to stand indoors for 3 days with the cap removed and thereafter used. The test piece requires a slightly greater writing pressure in the beginning for the removal of the dry surface but restores good writability immediately thereafter, showing no degradation.

EXAMPLE 2

A composition is prepared according to this invention in the same manner as in Example 1 except that [di-(p-methylbenzylidene)]-sorbitol is used in place of dibenzylidene sorbitol. Similarly a solid writing material is prepared from the composition.

The material is fully comparable to the material of Example 1 in respect of writability, erasability and stability against degradation.

EXAMPLE 3

A composition is prepared according to this invention in the same manner as in Example 1 except that [di-(m-ethylbenzylidene)]-sorbitol is used in place of dibenzylidene sorbitol. Similarly a solid writing material is prepared from the composition.

The material is substantially equivalent to that of Example 1 in properties.

Example 4

To 40 parts of ethylene glycol monomethyl ether are added 15 parts of ethyl cellulose (trade mark: "Ethcell H," product of Dow Chemical Corporation, U.S.A.), 20 parts of isopropyl palmitate and 10 parts of liquid paraffin, and the mixture is stirred at room temperature to prepare a solution. A 5 parts quantity of Solvent Blue 55 (trade mark: "Neozapon Blue FLE," product of BASF Dyes and Chemicals Ltd., West Germany) is added to and completely dissolved in the solution with continued stirring. Subsequently 5 parts of dibenzylidene sorbitol (the same as one used in Ex.1) heated to 100° to 110° C. is added to and completely dissolved in the solution with continued heating and stirring. The composition obtained is then placed into a hollow cylindrical mold, 12 mm in inside diameter and 60 mm in length, cooled for solidification and thereafter withdrawn from the mold. The solid writing material thus prepared has good writability on various writing panels, and the writings or drawings thereon are easily erasable with dry fabric, leaving no traces of stain.

The solid writing material is wrapped up in an aluminum foil, then allowed to stand for 6 months and thereafter used. No substantial changes are found in its writability and erasability.

EXAMPLE 5

| | |
|---|---|
| Vinyl acetate-vinyl chloride copolymer (trademark: "Denka 1000A," product of Electro Chemical Industries Co., Ltd., Japan) | 25 parts |
| Methyl isobutyl ketone | 24 parts |
| Xylene | 20 parts |
| Oil-soluble anthraquinone dye (C.I. Solvent Violet 14) | 4 parts |
| Butyl myristate | 20 parts |
| Liquid paraffin | 2 parts |
| Tribenzylidene sorbitol (trade mark: "Gelol T," product of New Japan Chemical Co., Ltd., Japan) | 5 parts |

In the same manner as in Example 4, a composition and a solid writing material are prepared from the above ingredients according to this invention.

The writing material is found to be equivalent to that of Example 4 in writability, erasability and stability against degradation.

EXAMPLE 6

A composition of this invention and a solid writing material are prepared in the same manner as in Example 5 except that [tri-(p-methylbenzylidene)]-sorbitol is used in place of tribenzylidene sorbitol.

The solid writing material is found to be fully comparable to that of Example 5 in properties.

EXAMPLE 7

A composition of this invention and a solid writing material are prepared in the same manner as in Example 5 except that [tri-(m-ethylbenzylidene)]-sorbitol is used in place of tribenzylidene sorbitol.

The solid writing material is found to be equivalent to that of Example 5 in properties.

EXAMPLE 8

| | |
|---|---|
| Polystyrene (polymerization degree: 1,600–1,800) | 20 parts |
| Tetrachloroethylene | 27 parts |
| Ethylene glycol monobutyl ether | 15 parts |
| Azo dye (Fast Orange RR, product of Dainichi seika Color & Chemicals Manufacturing Co., Ltd., Japan) | 7 parts |
| Propyl stearate | 25 parts |
| Dibenzylidene sorbitol (the same as one used in Ex. 1) | 3 parts |
| Tribenzylidene sorbitol (the same as one used in Ex. 5) | 3 parts |

In the same manner as in Example 4, a composition and a solid writing material are prepared from the above ingredients according to this invention.

The solid writing material has good writability on various writing panels. The writings or drawings are completely erasable with dry soft paper.

The writing material is wrapped up with an aluminum foil except for its one end, allowed to stand for 5 days and thereafter used. Despite the slightly increased resistance encountered and the reduced writability resulting therefrom in the beginning of writing, the material restores good writability on removal of the dry portion.

EXAMPLE 9

A composition of this invention is prepared in the same manner as in Example 8 except that [di-(p-methylbenzylidene)]-sorbitol is used in place of dibenzylidene sorbitol with [tri-(m-ethylbenzylidene)]-sorbitol also substituted for tribenzylidene sorbitol.

A solid writing material is prepared from the composition. The material is found to be comparable to that of Example 8 in writability, erasability and stability against degradation.

EXAMPLE 10

| | |
|---|---|
| Pigment processes with nitro cellulose (trade mark: "Nc Printing Black HX60," product of BASF Dyes & Chemicals Ltd., West Germany) | 20 parts |
| Polyvinyl butyral (the same as one used in Ex. 1) | 10 parts |
| Ethylene glycol monoethyl ether | 44 parts |
| Isopropyl myristate | 20 parts |
| Dibenzylidene sorbitol (the same as one used in Ex. 1) | 6 parts |

In the same manner as in Example 5, a composition and a solid writing material are prepared from the above ingredients according to this invention. The solid writing material is found comparable to that of Example 5 in properties.

EXAMPLE 11

| | |
|---|---|
| Phthalocyanine Blue 4920S | 7 parts |
| Polyvinylidene chloride (trade mark: "Saran Resin 310F," product of Asahi Dow Ltd., Japan) | 20 parts |
| Methyl isobutyl ketone | 20 parts |
| Cellosolve acetate | 20 parts |
| Diethylene glycol | 5 parts |
| Butyl stearate | 15 parts |
| Liquid paraffin | 8 parts |
| Dibenzylidene sorbitol (the same as one used in Ex. 1) | 5 parts |

In the same manner as in Example 5, a composition and a solid writing material are prepared from the above ingredients according to this invention. The solid writing material is found comparable to that of Example 5.

What I claim is:

1. A composition for use as a writing material comprising:
   (i) a first component consisting of at least one member selected from the group consisting of dibenzylidene sorbitol, [di-(alkylbenzylidene)] sorbitol, tribenzylidene sorbitol and [tri-(alkylbenzylidene)] sorbitol, said component being present in an amount of about 2 to 12 parts by weight in 100 parts by weight of the total composition,
   (ii) a second component consisting of an ester of a mono-saturated fatty acid having 10 to 20 carbon atoms and a mono-saturated aliphatic alcohol having 1 to 8 carbon atoms, said second component being present in an amount of about 10 to 50 parts by weight in 100 parts by weight of the total composition,
   (iii) a third component consisting of a vinyl resin, said third component being present in an amount of about 10 to 40 parts by weight in 100 parts by weight of the total composition,
   (iv) a fourth component consisting of a coloring agent, said forth component being present in an amount of about 2 to 30 parts by weight in 100 parts by weight of the total composition, and
   (v) a fifth component consisting of an organic solvent having a boiling point from about 70° to 220° C., said fifth component being present in an amount of about 30 to 70 parts by weight in 100 parts by weight of the total composition, whereby said composition is shapeable and handleable as a solid under steady or semi-steady conditions but flowable under pressure when used for writing or drawing.

2. Composition according to claim 1, wherein the first component (i) is at least one of dibenzylidene sorbitol and [di-(alkylbenzylidene)] sorbitols in which said alkyl group has 1 to 3 carbon atoms.

3. Composition according to claim 1, wherein the first component (i) is at least one of tribenzylidene sorbitol and [tri-(alkylbenzylidene)] sorbitols in which said alkyl group has 1 to 3 carbon atoms.

4. Composition according to claim 1, wherein the first component (i) is used in an amount of about 3 to 8 parts by weight per 100 parts by weight of the total composition.

5. Composition according to claim 1, wherein the second component (ii) is present in an amount of about 20 to 30 parts by weight per 100 parts by weight of the total composition.

6. Composition according to claim 1, wherein the third component (iii) is present in an amount of about 15 to 25 parts by weight per 100 parts by weight of the total composition.

7. Composition according to claim 1, wherein the fourth component (iv) is at least one of pigments and oil-soluble dyes.

8. Composition according to claim 7, wherein the fourth component (iv) comprises a pigment.

9. Composition according to claim 7, wherein the fourth component (iv) comprises an oil-soluble dye.

10. Composition according to claim 8, wherein said pigment is present in an amount of about 4 to 25 parts by weight per 100 parts by weight of the total composition.

11. Composition according to claim 9, wherein said oil-soluble dye is present in an amount of about 2 to 10 parts by weight per 100 parts by weight of the total composition.

12. Composition according to claim 11, wherein said oil-soluble dye is present in an amount of 3 to 7 parts by weight per 100 parts by weight of the total composition.

13. Composition according to claim 1, wherein the fifth component (v) has a boiling point of about 100° to about 200° C.

14. Composition according to claim 1, wherein the fifth component (v) is present in an amount of about 45 to 60 parts by weight per 100 parts by weight of the toal composition.

15. A method of preparing a composition for use as a writing material which is shapeable and handleable as a solid under steady or semi-steady conditions but flowable under pressure used for writing or drawing, said method comprising the step of mixing together: a first component (i) at least one of dibenzylidene sorbitol, [di-(alkylbenzylidene)] sorbitol, tribenzylidene sorbitol, and [tri-(alkylbenzylidene)] sorbitol, said first component being present in an amount of about 2 to 12 parts by weight in 100 parts by weight of the total composition, a second component (ii) consisting of at least one of esters of a mono-saturated fatty acid having 10 to 20 carbon atoms and a mono-saturated aliphatic alcohol having 1 to 8 carbon atoms, said second component being present in an amount of about 10 to 50 parts by weight in 100 parts by weight of the total composition, a third component (iii) consisting of a vinyl resin, said third component being present in an amount of about 10 to 40 parts by weight in 100 parts by weight of the total composition, a fourth component (iv) consisting of a coloring agent, said fourth component being present in an amount of about 2 to 30 parts by weight in 100 parts by weight of the total composition, and a fifth component (v) consisting of an organic solvent having a boiling point of about 70 to 220° C., said fifth component being present in an amount of about 30 to 70 parts by weight in 100 parts by weight of the total composition.

* * * * *